Sept. 20, 1966  C. H. LAPSLEY  3,273,484
CAMERA SUPPORTS

Filed Feb. 18, 1964  4 Sheets-Sheet 1

INVENTOR.
CHARLES H. LAPSLEY
BY
*Frank H. Borden*
ATTORNEY

Sept. 20, 1966 C. H. LAPSLEY 3,273,484
CAMERA SUPPORTS

Filed Feb. 18, 1964 4 Sheets-Sheet 2

INVENTOR.
CHARLES H. LAPSLEY
BY
Frank H. Borden
ATTORNEY

Sept. 20, 1966     C. H. LAPSLEY     3,273,484
CAMERA SUPPORTS
Filed Feb. 18, 1964     4 Sheets-Sheet 3
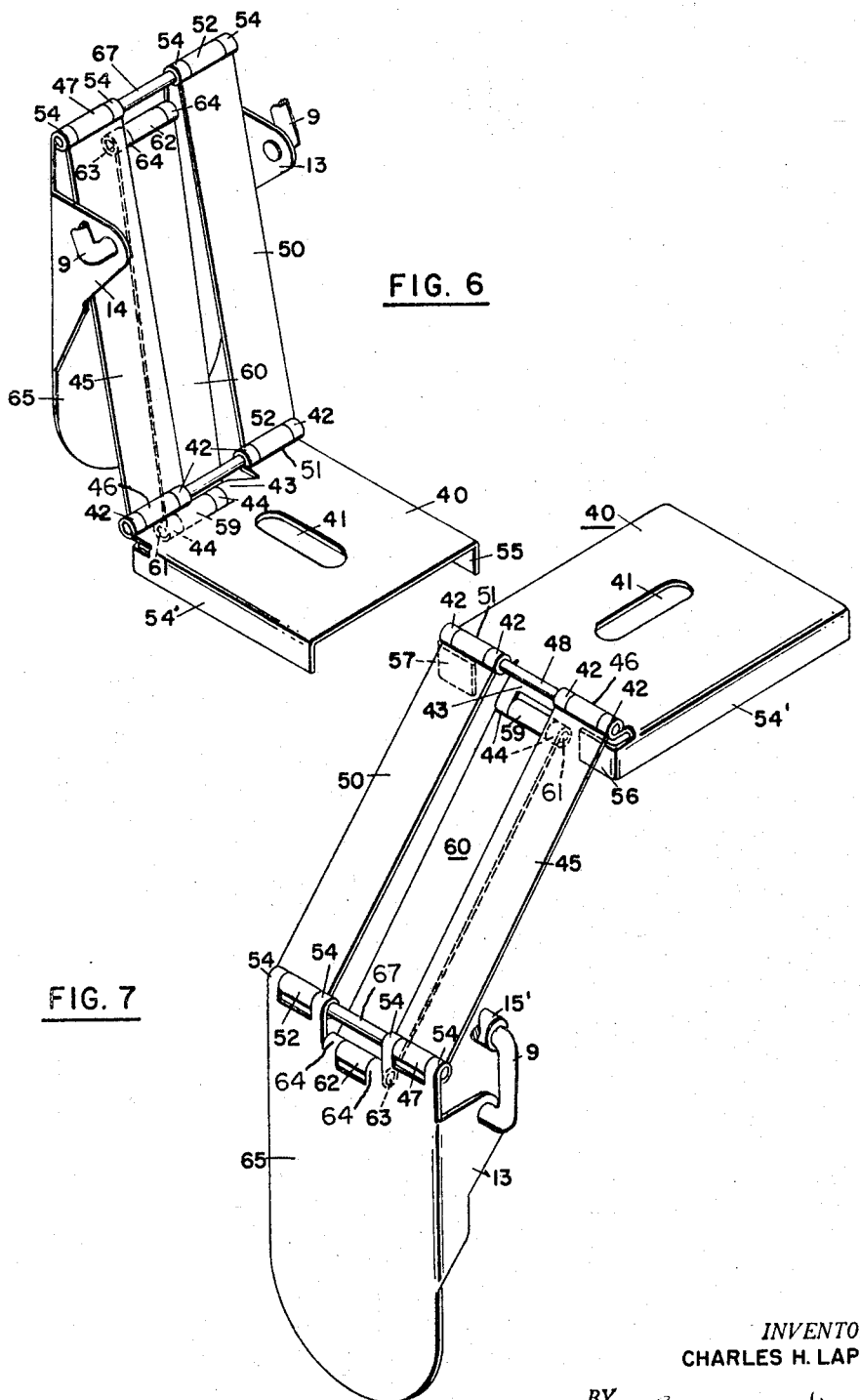
INVENTOR.
CHARLES H. LAPSLEY
BY
ATTORNEY Sept. 20, 1966  C. H. LAPSLEY  3,273,484
CAMERA SUPPORTS
Filed Feb. 18, 1964  4 Sheets-Sheet 4
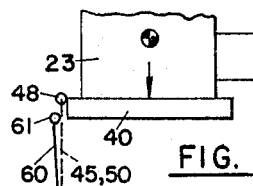
FIG. 8
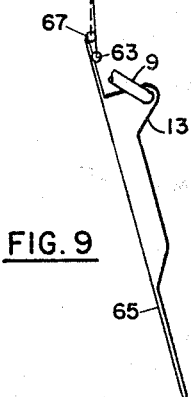
FIG. 9
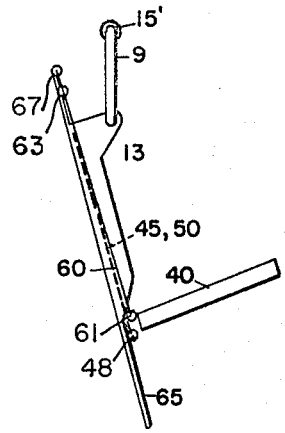
FIG. 10
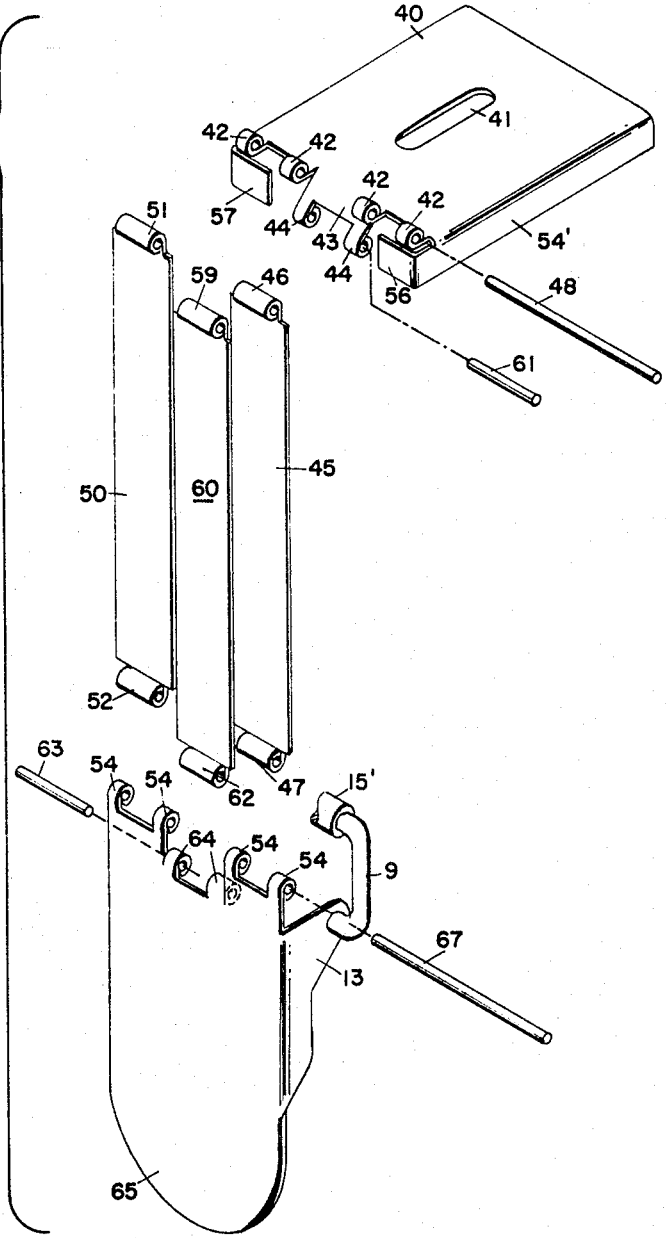
*INVENTOR.*
CHARLES H. LAPSLEY
BY Frank H. Borden
ATTORNEY United States Patent Office 3,273,484
Patented Sept. 20, 1966

3,273,484
CAMERA SUPPORTS
Charles H. Lapsley, 4200 Tyson Ave., Philadelphia, Pa.
Filed Feb. 18, 1964, Ser. No. 345,666
4 Claims. (Cl. 95—86)

This invention relates to camera supports for both still and motion picture cameras.

According to some of the prior practices, relatively-fixed adjustable supports have been utilized, such as tripods, monopods, clamps and the like. These are mostly floor and table top types of holding the camera steady in one position, such as for portraits and certain types of motion pictures. For such purposes the fixed supports are more or less ideal. However, they are cumbersome, unhandy and in the way generally, they comprise an added separate adjunct to the camera itself which must be transported, they require undue time to assemble and disassemble, and sometimes lead to dropping of the camera, with untoward results. For these and other reasons most cameras are held in the hand while sighting and taking pictures. This is true whether the cameras are carried in the hand, or are supported by a strap around the neck during inoperative periods, and held in the hand out of support by the strap during the actual picture sighting and taking.

Holding a movie camera in the hand during picture sighting and taking is the usual prior art practice. The pictures thus taken are almost never as accurate as when a fixed support is used, but they do include general panoramic changes of sighting and taking and other advertent, or inadvertent, variations from the fixed shot normally incident to the use of tripods and the like. However, when it is realized that a good movie camera weighs on the order of five pounds, it will be appreciated that while holding same in the hand, while sighting, moving levers and the like while maintaining the levelness and transverse sweep of the camera, becomes onerous. Furthermore, between scenes or camera use, laying the camera down is a hazard, as it may be knocked over, or stolen.

In carrying out the invention in an illutrative exemplification, a neck-strap-supported chest plate or support is provided bearing rearwardly against the chest of the operator, and a camera-supporting plate is provided. Links or rods are pivoted to and extend between the respective plates forming an articulation by which the camera-supporting plate can be swung from a lower position generally normal to the chest plate or support at which the camera is in an inoperative position, to an upper position also generally normal to but well above the chest plate or support at which the camera is generally horizontal and aligned with the eye of the operator, in a picture sighting or taking attitude, and is relatively immobile. The articulations are so disposed that the weight of the camera in the upper position substantially latches or anchors the camera-supporting plate in the upper position against inadvertent lowering to the camera-inoperative position. Thus in effect every user becomes his own, substantially rigid, tripod.

It is among the objects of this invention: to provide a novel camera support; which can mount either still or "movie" cameras; which protects the camera from damage due to dropping; which makes picture taking quicker and more pleasant than previous practices; which minimizes loss of cameras by thieves and the like; which provides a safe handle for carrying the camera and its support when detached from the person; which holds the camera steady at the eye level while sighting or taking pictures, or changing film or winding the camera, etc.; which relieves the strains, vibrations and inaccuracies incident to hand-holding of the camera for these various functions; which is usable for the facile transportation of a camera; is light in weight and low in cost; which is rigid against torsional strains; which requires merely a slight manual manipulation to transfer the camera from a lower transporting position or attitude to an operative latched eye-level operative position or attitude for manipulations of the camera or sighting or taking pictures.

Many other objects and advantages will become more apparent as the description proceeds.

In the accompanying drawings, forming part of this description:

FIG. 6 represents a fragmentary perspective of a modified, presently preferred, camera mounting plate, with plate links hinged to same at the rear edges thereof transversely of the camera plate, and transversely hinged to the chest plate or support, with the camera plate in the lower inoperative or transporting position.

FIG. 7 represents a fragmentary perspective, from another angle, of the plate linkage of FIG. 6, with the camera plate in its upper operative latched position.

FIG. 8 represents schematically an exploded perspective of the plate links, chest support and camera plate of FIGS. 6 and 7.

FIG. 9 represents schematically a side elevation of the chest support and the camera support plate, using the plate links as the articulation between them, showing the upper operative attitude of the camera support plate, indicating the C.G. of the camera and plate assembly.

FIG. 10 represents schematically a side elevation of the chest support and the camera plate showing the lower inoperative attitude of the latter and its articulation with the camera removed, for clarity.

Figure 1:
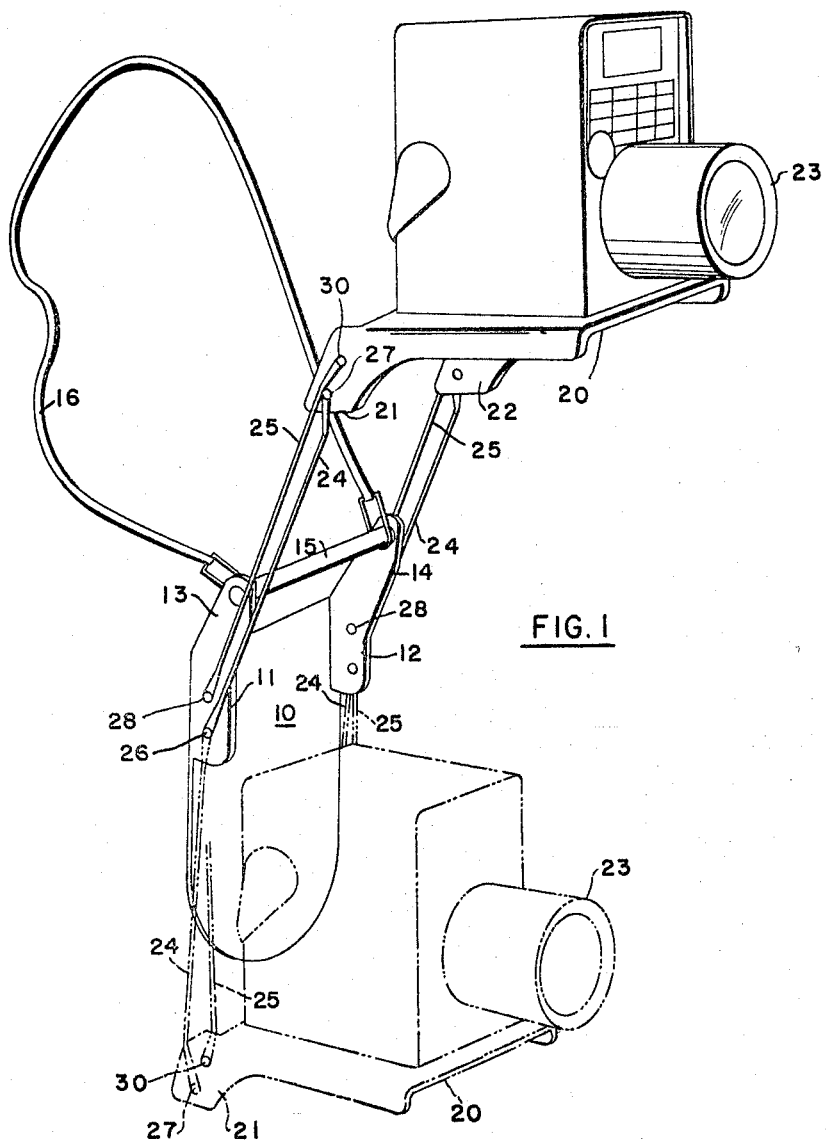
FIG. 1 represents a perspective of one form of the invention, exemplifying same, with the camera and its mounting plate and supporting linkage shown in its lower, carrying, inoperative position, in phantom, and with the camera and its mounting plate and the supporting linkage in the elevated, operative position, in full lines.
Figure 2:
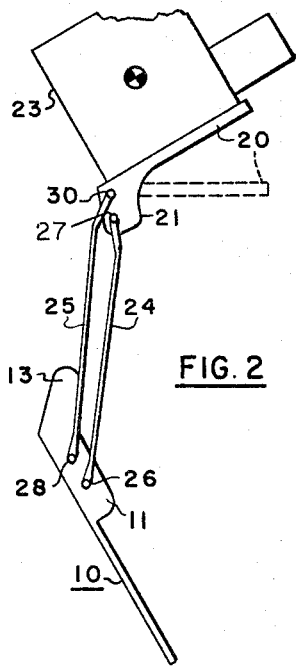
FIGS. 2 and 3 represent schematically the relation of the pivot points of the supporting links and the camera plate in the general upper position, successively in an unlatched generally inoperative upper position, and a latched upper operative position, maintained in the latter by the weight of the camera (and with the handle removed for clarity).
Figure 3:
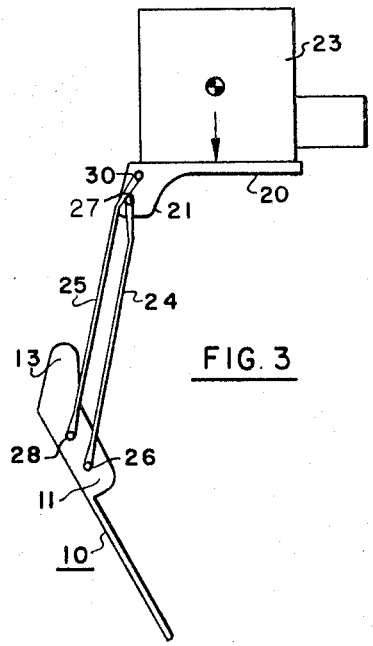
Figure 11:
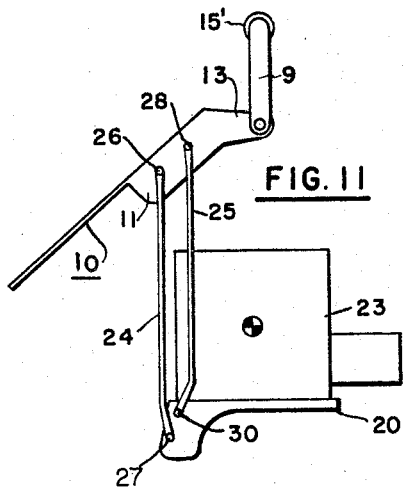
FIG. 11 represents a fragmentary perspective of an arrangement for supporting and hand carrying the assembly including a camera by which the weight of the assembly is balanced.

Referring to FIGS. 1, 2 and 3, a chest plate or related support 10 is provided, which may be longitudinally vertically rearwardly curved or concave to more comfortably rest against the external convexity of the operator's chest and contiguous areas. The chest plate or support may comprise spaced elements, instead of a continuous plate, and may include laterally extending resilient metallic strips to increase the bearing surface of the plate and enhance its rigidity (not shown). If desired torso-encircling straps may engage the plate 10 to increase its firmness of engagement against the chest of the operator (not shown). In the recited figures, the support 10, has lateral flanges, ears or webs 11 and 12, generally normal to the plate, and, by any suitable means at its upper end mounts a pair of supporting ears, projecting forwardly of the plate, as at 13 and 14, connected by a transverse bar 15, or the like, parallel to plate 10 but forwardly off-set therefrom. This forms a carrying handle for the assembly, when desired. Alternatively, as shown in FIG. 11, a handle 15' can be mounted on links 9, pivoted to ears 13 and 14. A flexible neck strap or the like 16 is removably engageable at its terminals with the ears 13 and 14 by suitable connections thereto. The entire weight of the camera loaded support assembly to be described is carried by strap 16 and by pressure of the chest support plate 10 against the chest, etc. of the operator.

A camera-engageable camera plate 20 is provided, having lateral down-turned flanges 21 and 22 at the rear end. A camera 23 is removably mounted on the plate 20, by any suitable means. If this is a movie camera, it may weigh as much as five pounds, and it will be noted that the center of gravity of the camera above the plate 20 is well forward of the ears 21 and 22. This is important in latching the camera plate 20 in its upper operative position, as will be pointed out.

It is important that some sort of pivoted relation be established between chest support or plate 10, and camera plate 20, whereby the camera plate can be arcuately moved vertically in front of the operator, between a lower inoperative position in one generally horizontal planar attitude, into an upper, operative, substantially parallel attitude. In one illustrative linkage or articulation on both sides of the respective plates, that of one side only will be described, as those on the other side are duplicates and bear the same characters.

Thus links, or rods, 24 and 25, 25' or 25a, to be described, which, for rigidity may be narrow plates, are provided, lying in a common plane parallel to the flanges 11 and 12 and ears 21 and 22. Link 24 is pivoted to the flange 11 at 26, and to ear 21 on plate 20 at 27. Link 5, which is shaped out of linearity is pivoted to plate or support 10 at flange 11 by pivot 28, vertically higher on flange 11 than pivot 26, at one end, and is pivotally connected at the other end at 30 to ear 21 on camera plate 20.

Figure 4:
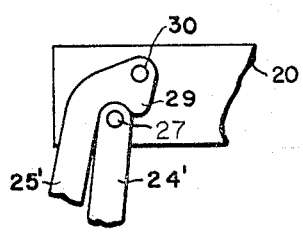
FIGS. 4 and 5 represent schematically fragmentary details of the modified upper ends of the linkages of FIGS. 1, 2 and 3, and a fragment of the camera supporting plate in latched position.
Figure 5:
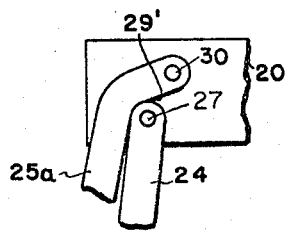

It will be understood that pivots 27 and 30 lie in a common plane transverse of camera plate 20, so that as the camera plate is elevated arcuately on the links from an intermediate mid-position to its upper position, said plane moves from generally normal to the links toward and within a few degrees of general alignment with a link. At this point pivot 27 is generally below and slightly outward of upper pivot 30, and the camera plate has a slight tilt and will swing bodily downwardly unless manually supported. (See FIG. 2.) At this point when the camera plate tilts vertically downwardly, manually or gravitationally on pivots 27 and 30 the common plane sweeps rearwardly into substantial link intersection as the lower pivot 27 moves relatively inwardly below the pivot 30 beyond the vertical projection of the latter. This causes pivot 27, or the end of link 24 engaging same, to move against bent or crooked link 25 in the operative attitude of the plate 20, as it is tilted downwardly on its pivots. This latches the plate 20 in its operative attitude, maintained by the force of the weight of the camera relatively to the pivots 27 and 30. In FIG. 4, the latching engagement of the outer ends of links 25' and 24' is enhanced by a depending enlargement 29. In FIG. 5 the outer end of link 25a is curved as at 29' to receive the end of link 24.

This is the situation, utilizing a bent link, where the links are in a common fore-and-aft plane parallel to the longitudinal axis of the camera and camera plate, and pivots 27 and 30 are parallel.

With the camera 23 mounted on the plate 20, and the latter swung downwardly relative to chest plate or support 10, the camera is in its lowered inoperative attitude, for transporting same. To make the transportation easier the entire assembly may be swung 90°, twisting the strap, and permitting the assembly on its side to abut the chest of the operator. This is an easier carry.

When the operator is alerted, the strap is untwisted so that the plate 10 abuts his chest, with the plate 20 in its lowered inoperative position relative thereto. When the desire to take a picture or make a sight develops, the operator simply grasps the camera or plate 20 with one hand while possibly steadying plate 10 with the other, and moves it forward and upward, until pivot 27 approaches alignment with pivot 30 and with the links, under pivot 30, as shown in FIG. 2. At this stage the operator lowers the outer or forward end of the camera and plate 20, aided by the off-set C.G. of the camera and camera plate, moving pivot 27 relatively transversely under and beyond pivot 30, until abutment between links 24 and 25, or 24' and 25', or 25a and 24 occurs, as the plate 20 and camera 23 assume the proper picture taking attitude. This is shown in FIG. 3, and in modified forms in FIGS. 4 and 5. This attitude is rigidly maintained on the operator's body, and brings the camera into alignment or appropriate juxtaposition with the operator's eye (governed by the operative length of strap 16), so that without any additional support, and with one hand operating the camera, the pictures can be taken, and by movement of the body the camera can sweep the scene without undue vibration or inaccuracies.

After taking the picture, the camera can be returned to its inoperative carrying attitude by simply raising the outer end of the camera or plate 20, swinging the plate on its pivots against the weight of the camera until pivot 27 can pass outwardly beyond pivot 30, unlatching the linkage, and thereafter the plate 20 moves outwardly, generally arcuately, downwardly until it assumes its lower inoperative carrying attitude.

It will be seen that dropping of the camera, or stealing of same while resting the hand that had been carrying it, and the use of tripods, clamps and the like are obviated. It will also be seen that if the strap support becomes onerous, upon disengaging one end of the strap the entire assembly can be easily carried in the hand of the operator without dislodging any parts of the assembly, by means of the off-set handle 15, or the pivoted handle 15'. The latter permits the C.G. of the assembly to be aligned vertically with the handle, facilitating the carrying.

A modified and simplified form of the invention is shown in FIGS. 6 to 10 inclusive, which is the presently preferred form. This is because of the economy involved over other forms, as the articulation is comprised of effectively two substantially linear links in the form of plates connected to the respective plates by parallel hinges, instead of by pivot pins as in the earlier forms, with one link transversely displaced relative to the other, and because the camera support is much more rigid in both attitudes. This is because it is much more resistant to torsional strains on the camera support plate relative to the chest support plate, while still having the same latching effect, as the lowermost hinge pivot passes under and beyond the line of the uppermost hinge pivot.

In this form of the invention a camera plate 40 is provided having a longitudinal slot 41 for adjustably mounting the camera (not shown). The plate 40 has two aligned pairs of spaced rear edge hinge eyes 42—42, and a rearwardly extending, downwardly angularly divergent rigid extension 43, extending between and beyond the pairs of aligned edge eyes 42, and having a pair of aligned rear edge hinge eyes 44. A plate link 45 having an upper end edge hinge eye 46 and a lower end edge hinge eye 47, is pivoted at its upper edge by common hinge pin or pintle 48 to the one pair of aligned eyes 42—42. A complemental plate link 50, having an upper end edge hinge eye 51 and a lower end edge hinge eye 52 is connected at its upper edge to the other pair of rear edge eyes 42—42 by common hinge pintle 48. The lower end hinge eyes 47 and 52 of plates 45 and 50 are pivoted to aligned pairs of hinge eyes 54—54 on plate 65, by common pintle 67. It will be seen that hinge eyes 46 and 51, and 47 and 52, respectively, are in alignment so that in effect plate links 45 and 50 comprise a single element of the articulation.

A complemental element of the articulation comprises a plate link 60, having upper hinge eye 59 pivoted to spaced eyes 44—44 on extension 43 by a pintle 61, and having a lower hinge eye 62. A pair of hinge eyes 64—64 are formed on chest plate 65 between and offset from the pairs of hinge eyes 54—54. Lower hinge eye 62 of plate link 60 is pivoted to the hinge eyes 64—64 by pintle 63.

The camera plate 40 has integral downwardly extending longitudinal flanges 54' and 55. An inwardly bent, normally extending tab 56 projects inwardly from flange 54' in general parallelism with the hinge pin or pintle 48. A similar tab 57 may be provided on flange 55 in general parallelism with hinge pintle 48. It will be seen that in one relative position of plate 40 and plate links 45 and 50 the respective tabs abut said links and limit downward motion of plate 40 relative to said links as well as motion of links 45 and 50 relative to the camera plate, and thus latch the camera plate against any motion except manual upward tilting.

It will be seen that the same latching principle is incorporated in these figures as has previously been described, in that hinge pivots 48 and 61 lie in a common plane transverse of the camera plate so that when swung upwardly the plane is close to alignment with the links so that downward tilt of the camera plate moves lower pivot 61 under and beyond pivot line 48, aided by the weight of the camera, until tabs 57 and 56 abut links 50 and 45, latching the camera plate in its upper position.

The advantages and economy of the invention will be apparent, as will the fact that many modifications and changes may be made in the invention without departing from the spirit and scope thereof.

I claim as my invention:

1. A camera support comprising a body-engageable element, camera-mounting means, a first link extending between and having pivotal axes on the element and on said means, a second link extending between and having pivotal axes on the element and means respectively spaced from the pivotal axes of said first link while being parallel thereto, whereby said means traverses a general curved path in moving from a relatively lower position toward a relatively higher position and return during which movement said means and said links have relative movement, said means being extended in one direction beyond the axes of said first and second links thereon and developing a gravitational moment relative thereto, said means in said higher position being movable on and with said links between a first and a second attitude, said means in said first attitude having one link axis on said means generally below and forwardly of the other link axis thereon, and in said second attitude having said one link axis thereon generally below and rearwardly of said other link axis thereon, and latching means responsive to movement of said camera-mounting means from its first to its second attitude aided by said moment anchoring said mounting means and links against motion whereby the mounting means is supported rigidly in said second attitude on and relative to said element.

2. A camera support comprising a body-engageable element, camera-mounting means, a first link extending between and having pivotal axes on the element and on the means, a second link extending between and having pivotal axes on the element and on the means, the pivotal axes of said second link on both the element and means being offset from the respective axes of the first link on the element and means whereby said mounting means is manually movable from a generally lower position into a generally higher position, said means in the generally higher position movable on the respective pivots of the first and second links on said means between a relatively angularly tilted attitude and a relatively untilted attitude, said respective link pivots on said means comprising respectively an upper pivot and a lower pivot lying in a common plane transverse of said means, said plane extending downwardly relatively forwardly in said angularly tilted attitude and extending downwardly relatively rearwardly in said relatively untilted attitude, and means responsive to the motion of the mounting means from its relatively tilted attitude toward its relatively untilted attitude anchoring said mounting means and links precluding motion of either.

3. A camera support as in claim 2 in which the means responsive comprises abutment portions on the respective links.

4. A camera support as in claim 2 in which the means responsive comprises abutment portions on the mounting means and a link.

References Cited by the Examiner

UNITED STATES PATENTS

| 713,177 | 11/1902 | Thomsen | 95—86 |
|---|---|---|---|
| 2,073,998 | 3/1937 | Raby | 248—124 |

FOREIGN PATENTS 716,252   1/1942   Germany.

JOHN M. HORAN, *Primary Examiner.*